March 7, 1939.   T. P. LEAMAN   2,149,352
UNIVERSAL JOINT
Filed April 18, 1938   2 Sheets-Sheet 1
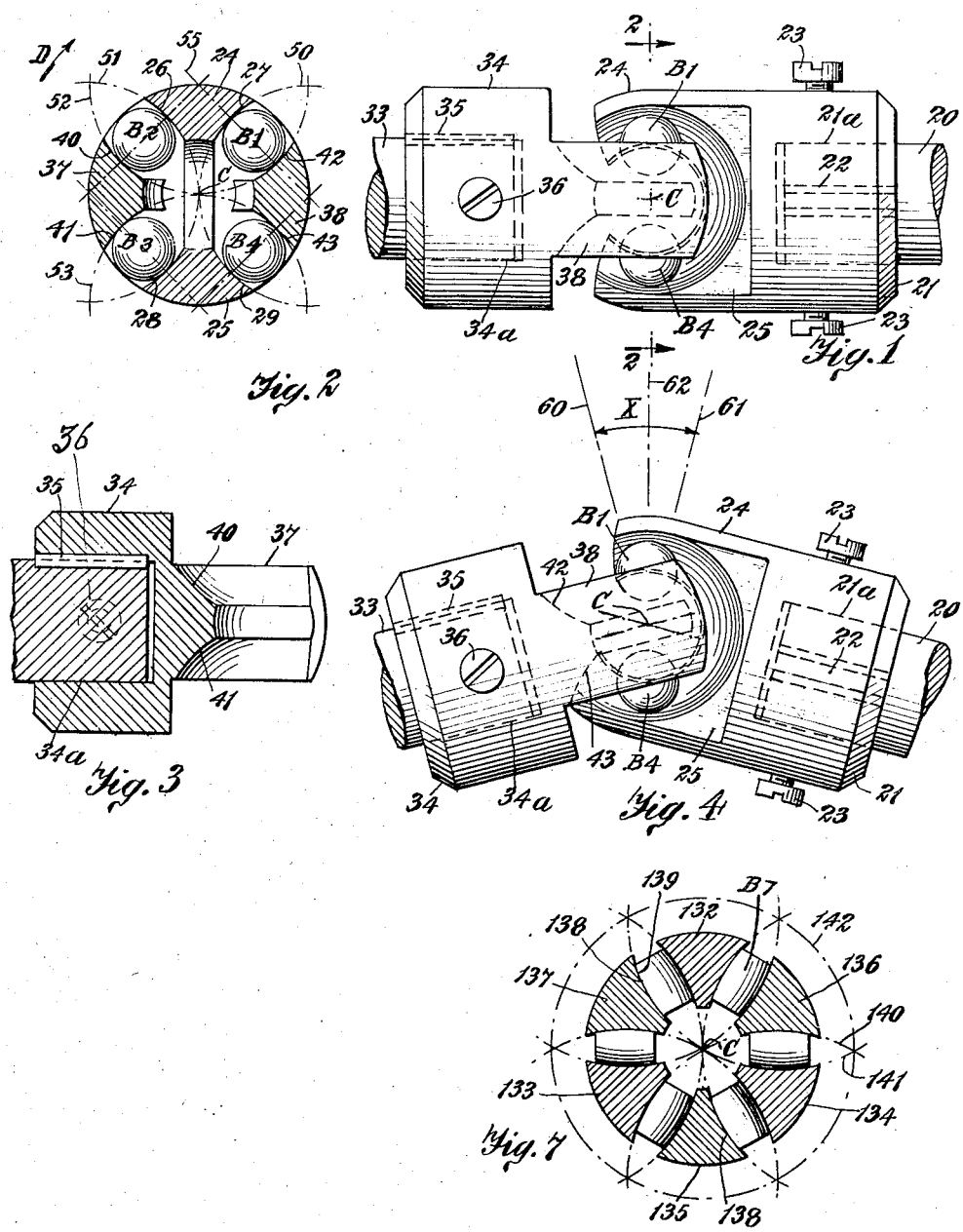
INVENTOR.
THOMAS P. LEAMAN
BY A. A. de Domville
ATTORNEY.

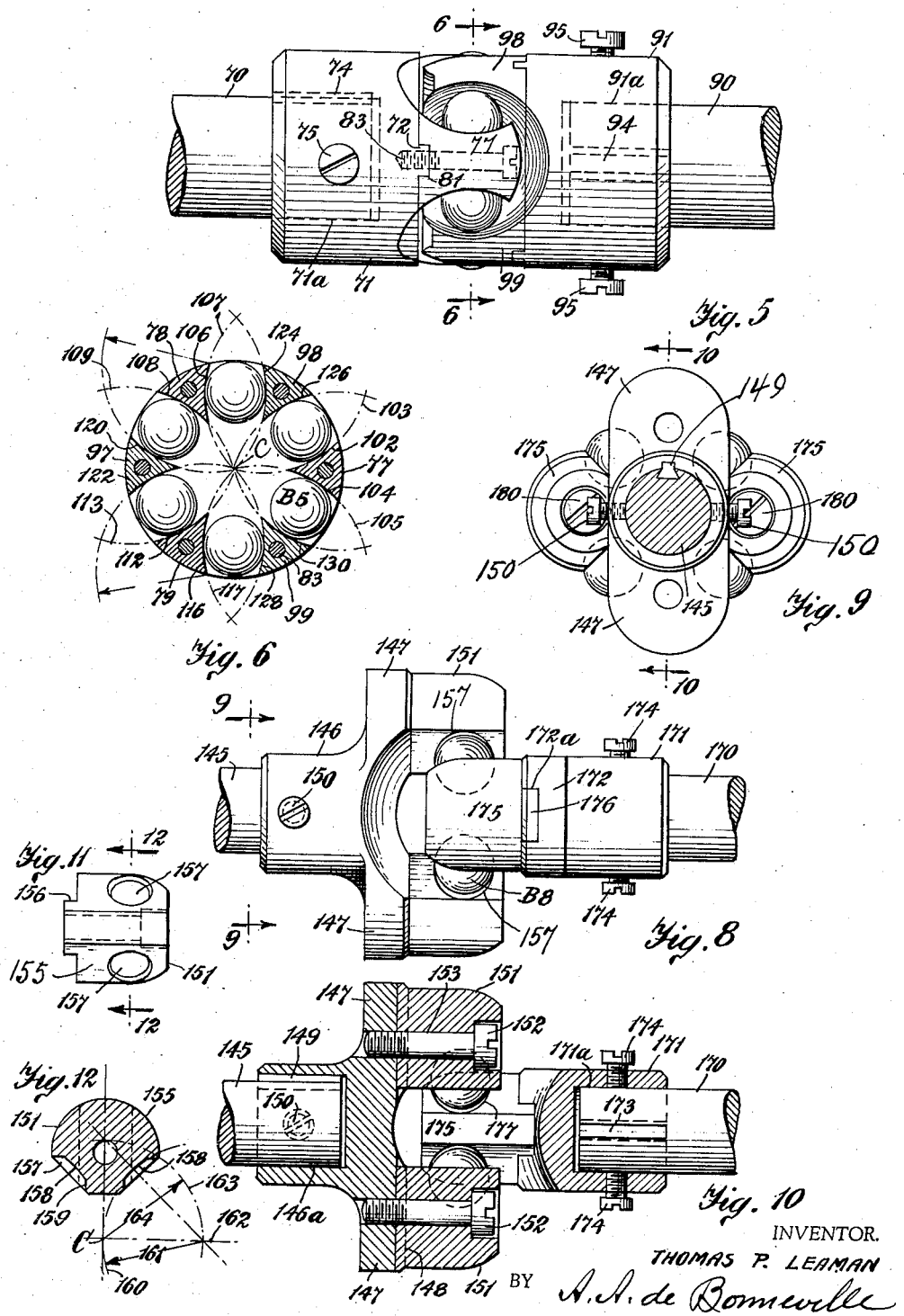

Patented Mar. 7, 1939

2,149,352

UNITED STATES PATENT OFFICE 2,149,352

UNIVERSAL JOINT

Thomas P. Leaman, Babylon, N. Y.

Application April 18, 1938, Serial No. 202,660

6 Claims. (Cl. 64—21)

This invention relates to a universal joint.

The object of the invention is the production of a universal joint, by means of which rotation can be easily transmitted from one shaft to another, with the axis of one shaft coaxial with the other or making an angle therewith.

The second object of the invention is the production of a universal joint having balls for the transmission of power from one of its shafts to the other, the torque force passing through the balls always being normal to the surface of its coacting prong races.

The third object of the invention is the production of a universal joint having prongs with oppositely positioned concave spherical ball races, which support power transmitting balls, the centers of which are confined to the plane bisecting the dihedral angle of the inclination of the two shafts.

The fourth object of the invention is the production of a universal joint, in which power is transmitted from one shaft to a second shaft at a constant velocity.

In the drawings Fig. 1 represents an elevation of an exemplification of the universal joint with four prongs; Fig. 2 shows a section of Fig. 1 on the line 2, 2; Fig. 3 is a vertical section through the left hand portion of Fig. 1; Fig. 4 shows a view similar to Fig. 1 with its shafts inclined to each other; Fig. 5 shows an elevation of a modification of the universal joint with six prongs; Fig. 6 is a section of Fig. 5 on the line 6, 6; Fig. 7 shows a section similar to Fig. 6 with power transmitting rollers in place of balls; Fig. 8 represents an elevation of a further modification of the universal joint; Fig. 9 is a section of Fig. 8 on the line 9, 9; Fig. 10 shows a partial section of Fig. 9 on the line 10, 10; Fig. 11 represents a bottom view of a portion of Fig. 8 and Fig. 12 is a section of Fig. 11 on the line 12, 12.

Referring to Figs 1 to 4, a shaft 20 is detachably connected to the socket 21, having the cylindrical pocket 21a. The shaft 20 is positioned in the pocket 21a, and is secured in place by the spline 22 and the screws 23. The socket 21 has integral therewith the pair of similar prongs 24 and 25. The prong 24 is shown with the concave spherical shaped and oppositely positioned ball races 26 and 27, and the prong 25 is indicated with the concave spherical shaped and oppositely positioned ball races 28 and 29. The second shaft of the universal joint is indicated at 33 and is detachably connected to the socket 34 having the cylindrical pocket 34a. The shaft 33 is positioned in the pocket 34a and is secured in place by the spline 35 and diagonally opposite screws 36.

The socket 34 has integral therewith the pair of prongs 37 and 38 similar to the prongs 24 and 25. The prong 37 is shown with the concave spherical shaped and oppositely positioned ball races 40 and 41, and the prong 38 is indicated with the concave spherical shaped oppositely positioned ball races 42 and 43.

Referring to Fig. 2 attention is called to the ball races of the prongs of the universal joint. The ball race 27 of the prong 24 and the ball race 29 of the prong 25, lie in the spherical surface of a sphere indicated by the dotted line 50 which passes through the point C. The ball race 26 of the prong 24 and the ball race 28 of the prong 25 lie in the surface of the sphere indicated at 51, which also passes through the point C. The spheres 50 and 51 are tangent to each other at the said point C. The point C is located at the intersection of the longitudinal axes of the shafts 20 and 33, when the latter are inclined to each other, see Fig. 4. The concave spherical shaped ball race 40 of the prong 37, and the concave spherical shaped ball race 42 of the prong 38, lie in the surface of the sphere 52, which latter passes through the point C. The concave spherical shaped ball race 41 of the prong 37 and the concave spherical shaped ball race 43 of the prong 38, lie in the surface of the sphere 53 which also passes through the point C.

The diameters of the spheres 50, 51, 52 and 53 are equal to one another, and their surfaces all extend through the point C. A square is indicated in its entirety by the numeral 55, and the intersecting points of its sides indicate the centers of the spheres 50, 51, 52 and 53.

The power transmitting balls for the universal joint are shown at B1, B2, B3, and B4, and they bear against the concave spherical shaped ball races of the prongs with which they coact as shown in Fig. 2. The center of gravity of the combined balls B1, B2, B3 and B4 is at the point C.

When power is transmitted from the shaft 33 to the shaft 20 in the direction of the arrow D, Fig. 2, the ball B2 and its diagonally opposite ball B4 transmit said power, and when power is transmitted in a direction opposite to the arrow D, the ball B1 and its diagonally opposite ball B3, transmits said power. The driving forces of the balls are always normal to the concave spherical races of their coacting prongs.

In Fig. 4 the axes of the shafts 20 and 30 are inclined to each other, and to determine the proper position of any of the power transmitting balls we will consider the ball B1. A line 60 is drawn through the point C at right angles to the longitudinal axis of the shaft 33, and a line 61 is drawn through the point C at right angles to the longitudinal axis of the shaft 20. The angle between the lines 60 and 61 is indicated at X, and the center of the ball B1 is located in a plane 62 bisecting the angle X. The concave spherical ball races of the prongs coacting with the ball B1 confine the latter to the said plane 62.

Referring to Figs. 5 and 6, which show a six prong universal joint, a shaft 70 is indicated with its socket 71 having the cylindrical pocket 71a and the projection 72. The shaft 70 is positioned in the pocket 71a and is detachably secured in place by the spline 74 and the screws 75 similar to 23. The socket 71 has connected thereto the similar detachable prong members 77, 78 and 79. Each of said prong members is provided with the recess 81, which engages the adjacent projection 72. A screw 83 connects each of the prong members 77, 78 and 79 to the socket 71.

The second shaft of the universal joint is indicated at 90, and its socket is shown at 91 similar to 71, with the cylindrical pocket 91a. The shaft 90 is positioned in the pocket 91a and is detachably secured in place by the spline 94 similar to 74 and the screws 95.

The socket 91 has connected thereto the detachable prong members 97, 98 and 99 similar to 77, 78 and 79, by screws 83 as described for the other prong members. The prong member 77 is shown with the concave spherical ball race 102, with its surface coincident with the surface of the sphere 103, and the concave spherical ball race 104 is coincident with the surface of the sphere 105. The detachable prong member 78 is shown with the concave spherical ball race 106 coincident with the surface of the sphere 107, and the concave spherical race 108 is coincident with the surface of the sphere 109. The detachable prong member 79 is indicated with the concave spherical ball race 112 coincident with the surface of the sphere 113, and the concave spherical ball race 116 is coincident with the surface of the sphere 117. It will be noted that all the spheres 103, 105, 107, 109, 113 and 117 are of the same diameter, and pass through the point C in the longitudinal axes of the shafts 70 and 90.

The detachable prong members 97, 98 and 99 are provided with the concave spherical races 120, 122, 124, 126, 128 and 130, similar to the ball races of the prong members 77, 78 and 79.

Power transmitting balls B5 are provided for the prong members.

The center of gravity of the balls B5 is always at the point C where the shafts 70 and 90 intersect when inclined to each other.

Referring to Fig. 7, a section is indicated similar to that shown in Fig. 6. Prongs 132, 133, and 134 are indicated for one of the sockets, not shown, of the universal joint, and prongs 135, 136 and 137 are indicated for the other socket, not shown, of the universal joint.

In this instance instead of the power transmitting balls, rollers B7 are used, each having the surface 138, which conform to the concave spherical bearing surface 139 of each of the prongs of the universal joint. The surfaces 139 are coincident with the surfaces of the spheres of equal diameter, two of which are shown at 140 and 141. Each of the latter spheres pass through the point C in the longitudinal axes of the shafts of the universal joint. The centers of the latter spheres are all located in the circle 142.

Referring to Figs. 8 to 12 inclusive, another modification of the universal joint is indicated, and is preferably used when the longitudinal axes of the shafts of the universal joint are inclined to each other only a few degrees. In this instance a shaft 145 is connected to the socket 146 having the cylindrical pocket 146a, the jaws 147 and a recess 148. The said shaft 145 is positioned in the pocket 146a and is secured in place by the spline 149 and the screws 150. To each of the jaws 147 is connected a detachable prong member 151, by means of the screws 152, which extend through the openings 153. Each prong member 151 is indicated having the cylindrical body portion 155, and the projection 156 at its lower end. Near the upper end of the body portion 155 are indicated the concaved spherical bearing pockets 157, which each have the concaved spherical bearing surface 158 with the inclined circumferential wall 159. The surfaces 158 are each coincident with the surfaces of spheres, one of which is shown at 160 having the radius 161. The said spheres all pass through the point C of the longitudinal axes of the shafts of the universal joint as already described.

One end of the radius 161 of the surface 158 is indicated at the point 162, of the line 163 struck with the radius 164. The other shaft of the universal joint is indicated at 170, which supports the socket 171 having the cylindrical pocket 171a and jaws 172, each with the recess 172a. The shaft 170 is positioned in the pocket 171a and is secured in place by the spline 173 and the screws 174.

To each of the jaws 172 is connected a detachable prong member 175 similar to 151 and which has extending therefrom the projection 176, which engages the recess 172a. Near the outer end of each prong member 175 is indicated the spherical concaved bearing pocket 177 similar to 157. Power transmitting balls B8 are sealed in the pockets of the prong members. Screws 180 connect the prong members 175 to the jaws 172.

The invention may be modified by inserting a third shaft between the pair of shafts as described, and connecting the third shaft with the other shafts, by means of power transmitting balls and their coacting concave spherical shaped ball races as described.

Various modifications may be made in the invention and the present exemplification is to be taken as illustrative and not limitative thereof.

Having described my invention I claim:

1. In a universal joint the combination of a pair of sockets, a shaft supported in each socket, said sockets having prongs with oppositely positioned concave spherical shaped ball races and balls positioned in each pair of oppositely positioned ball races.

2. In a universal joint the combination of a pair of shafts with their longitudinal axes in line or inclined to each other, a socket detachably connected to each shaft, each socket having prongs extending therefrom, the latter having concaved spherical shaped ball races, and a ball positioned in the ball races of each pair of adjacent prongs to transmit rotation from one shaft to the other.

3. In a universal joint the combination of a pair of shafts, a socket supported on each shaft having prongs extending therefrom, each prong having oppositely positioned concave spherical shaped ball races, and balls positioned in each pair of adjacent ball races of the prongs, the surfaces of said ball races coincident with the surfaces of spheres of equal diameter extending through the longitudinal axes of the shafts at their intersection when inclined to each other.

4. In a universal joint to transmit power and rotation, the combination of a pair of shafts, a socket supported in each shaft, a detachable prong member connected to each socket, each prong member having oppositely positioned concave spherical shaped ball races formed therewith and power transmitting balls between the ball races of the prongs of one socket and the ball races of the adjacent prongs of the other socket.

5. In a universal join to transmit power, the combination of a pair of shafts with their axes in line or inclined to each other, a socket supported on each shaft, a spline and screws connecting each socket to its shaft, each prong having oppositely positioned concave spherical shaped ball races formed therewith and a power transmitting ball between the ball race of each prong of one socket and the adjacent ball race of the prong of the other socket.

6. In a universal joint to transmit power, the combination of a pair of shafts with their axes in line or inclined to each other, a socket detachably supported on each shaft having jaws integral therewith, prong members detachably connected to each jaw, each prong member having a pair of concaved spherical shaped bearing pockets formed therewith and power transmitting balls bearing against the spherical surface of each pocket of the prong members of one socket and the spherical surface of the adjacent pocket on the prong member of the other socket.

THOMAS P. LEAMAN.